US011692116B2

(12) United States Patent
Zhu et al.

(10) Patent No.: US 11,692,116 B2
(45) Date of Patent: Jul. 4, 2023

(54) PHASE CHANGE MATERIAL COMPOSITION AND METHOD OF PREPARATION THEREOF

(71) Applicant: AGENCY FOR SCIENCE, TECHNOLOGY AND RESEARCH, Singapore (SG)

(72) Inventors: Qiang Zhu, Singapore (SG); Tao Tang, Singapore (SG); Ying Ying Lesley Low, Singapore (SG); Xiang Yun Debbie Soo, Singapore (SG); Jian Wei Xu, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 643 days.

(21) Appl. No.: 16/496,955

(22) PCT Filed: Mar. 23, 2018

(86) PCT No.: PCT/SG2018/050133
§ 371 (c)(1),
(2) Date: Sep. 23, 2019

(87) PCT Pub. No.: WO2018/174829
PCT Pub. Date: Sep. 27, 2018

(65) Prior Publication Data
US 2021/0292629 A1  Sep. 23, 2021

(30) Foreign Application Priority Data

Mar. 23, 2017 (SG) .......................... 10201702394X

(51) Int. Cl.
*C09K 5/06* (2006.01)
*F25D 3/02* (2006.01)
(Continued)

(52) U.S. Cl.
CPC .............. *C09K 5/063* (2013.01); *B32B 7/027* (2019.01); *B65D 81/38* (2013.01); *F25D 3/02* (2013.01);
(Continued)

(58) Field of Classification Search
CPC .. C09K 5/00; C09K 5/06; C09K 5/063; F25D 3/02; F25D 3/08; F25D 2303/085; Y02E 60/14
See application file for complete search history.

(56) References Cited

U.S. PATENT DOCUMENTS 4,077,809 A * 3/1978 Plunguian ............... C04B 28/02
106/786
4,572,864 A * 2/1986 Benson .................... C09K 5/00
252/70

(Continued)

FOREIGN PATENT DOCUMENTS

CN  102827588 A * 12/2012
CN  102827588 A   12/2012
(Continued)

OTHER PUBLICATIONS

English language machine translation of CN 102827588 A (Year: 2012).*

(Continued)

*Primary Examiner* — Matthew R Diaz
(74) *Attorney, Agent, or Firm* — Womble Bond Dickinson (US) LLP

(57) ABSTRACT

The present disclosure relates to a phase change material (PCM) composition and a process for preparation thereof, wherein said composition comprising a phase change material, glass fibers and xanthan gum. In a preferred embodiment, the phase change material is water (or ice) and the glass fibers are glass wool. The disclosure also relates to a (Continued)

stackable and sealable package enclosing the PCM composition. In a particular embodiment, the PCM composition is used to prepare a cold box that may be used in cold chain transportation.

20 Claims, 11 Drawing Sheets

(51) Int. Cl.
*B32B 7/027* (2019.01)
*B65D 81/38* (2006.01)
(52) U.S. Cl.
CPC ......... *F25D 2303/085* (2013.01); *Y02E 60/14* (2013.01)

(56) References Cited

U.S. PATENT DOCUMENTS

| | | | | |
|---|---|---|---|---|
| 5,100,570 A * | 3/1992 | Ames | ................ | C09K 5/02 165/10 |
| 5,718,835 A * | 2/1998 | Momose | ................ | C09K 5/063 252/73 |
| 6,855,422 B2 * | 2/2005 | Magill | ................ | F28D 20/02 442/361 |
| 8,308,861 B2 * | 11/2012 | Rolland | ................ | C09K 5/063 252/70 |
| 8,790,540 B2 * | 7/2014 | Holloway | ................ | C09K 5/063 252/70 |

FOREIGN PATENT DOCUMENTS

| | | | | |
|---|---|---|---|---|
| CN | 103666381 A | * | 3/2014 | ............ C09K 5/063 |
| CN | 103666381 A | | 3/2014 | |
| CN | 103756645 A | | 4/2014 | |
| CN | 109609102 A | * | 4/2019 | ............ C09K 5/063 |
| WO | 2016204284 A1 | | 12/2016 | |

OTHER PUBLICATIONS

English language machine translation of CN 103666381 A (Year: 2014).*
International Preliminary Report on Patentability dated Feb. 18, 2019 for related PCT Application No. PCT/SG2018/050133.
International Search Report and Written Opinion dated Jun. 4, 2018 for related PCT Application No. PCT/SG2018/050133.

* cited by examiner

[Fig. 1]
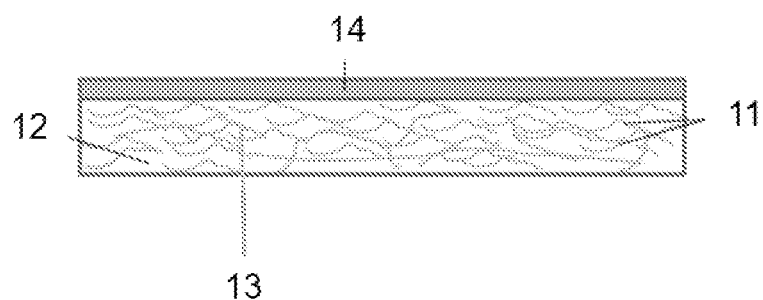

[Fig. 2]
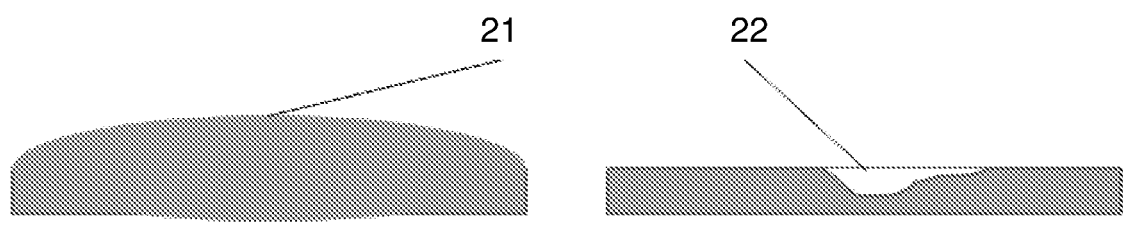

[Fig. 3]
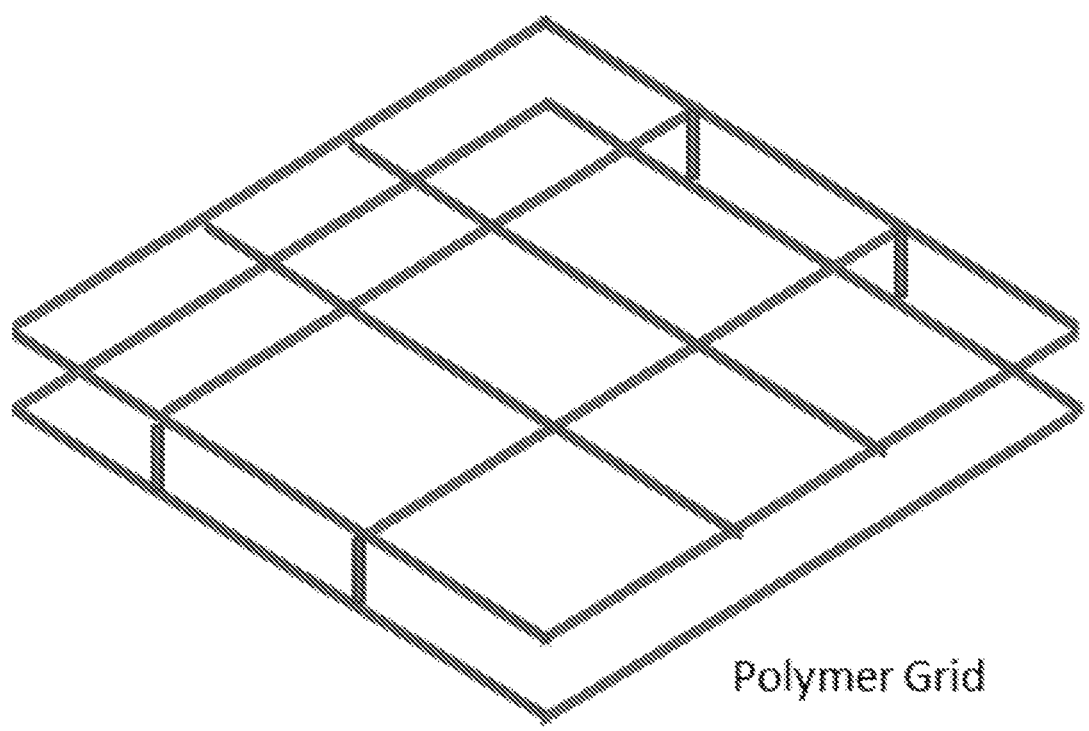

[Fig. 4]
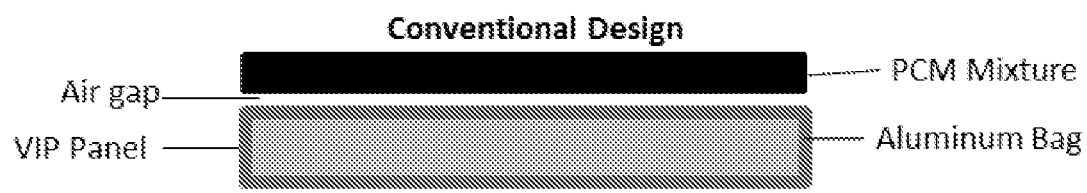

[Fig. 5]

[Fig. 6]
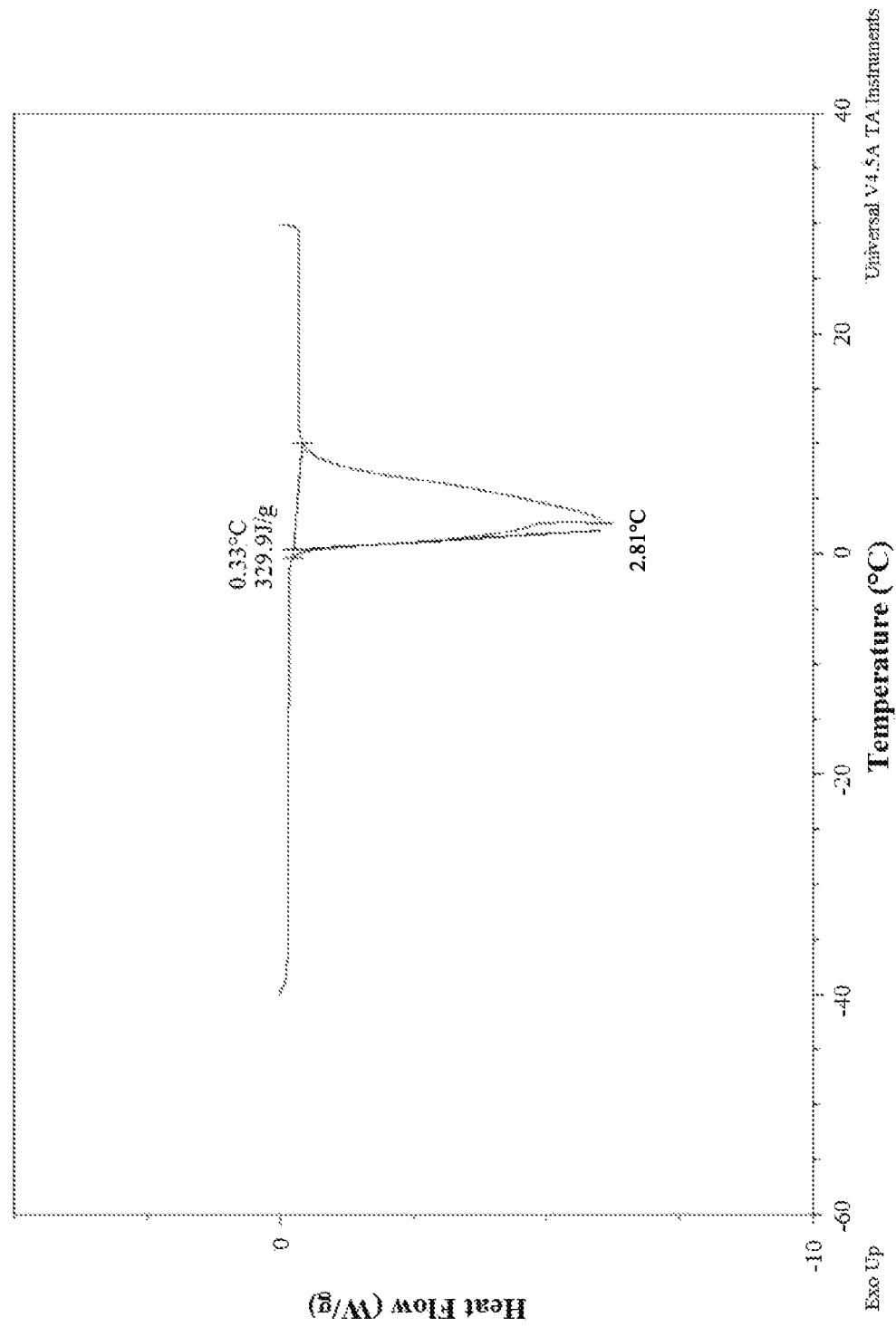

[Fig. 7]
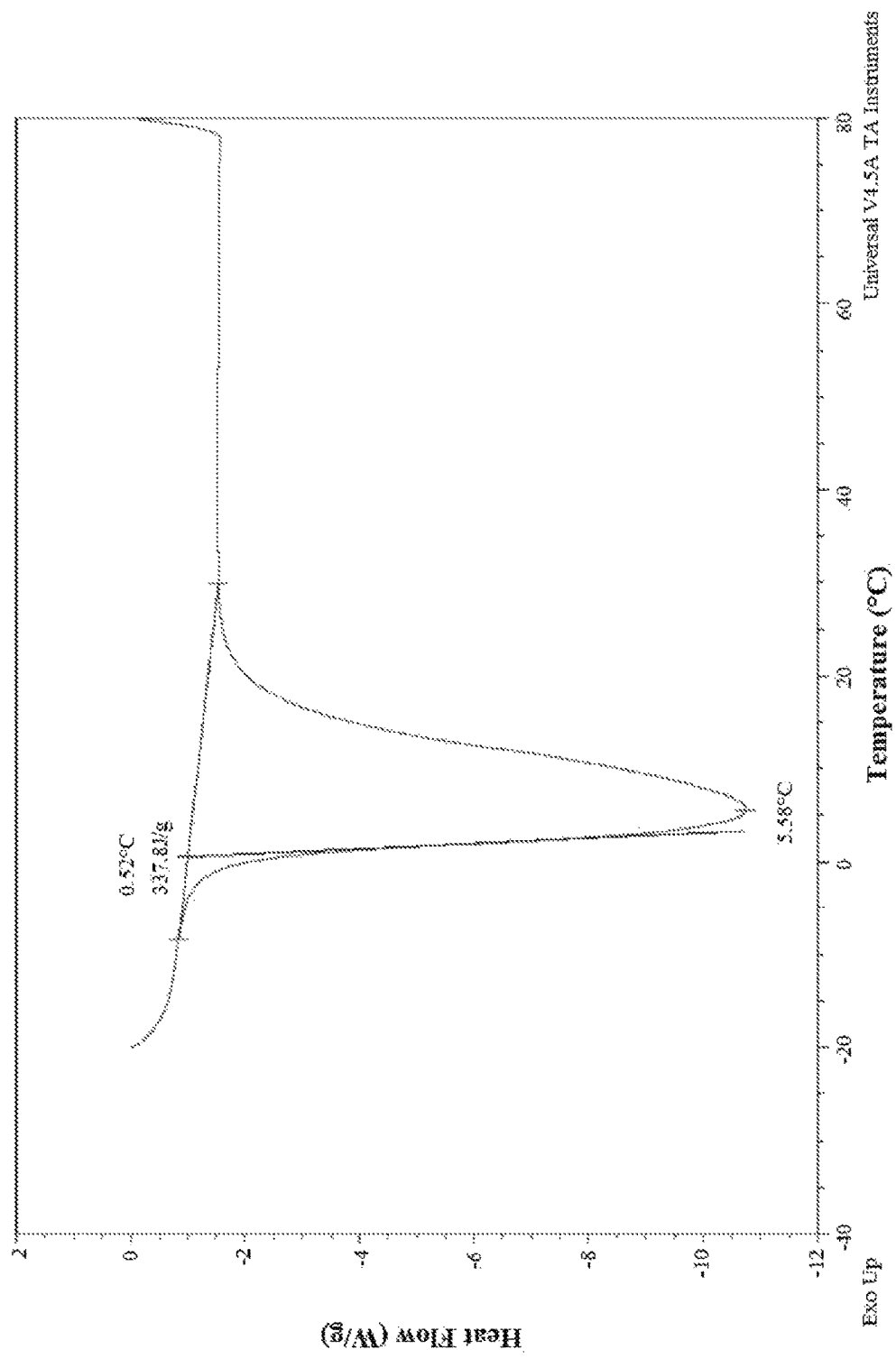

[Fig. 8]
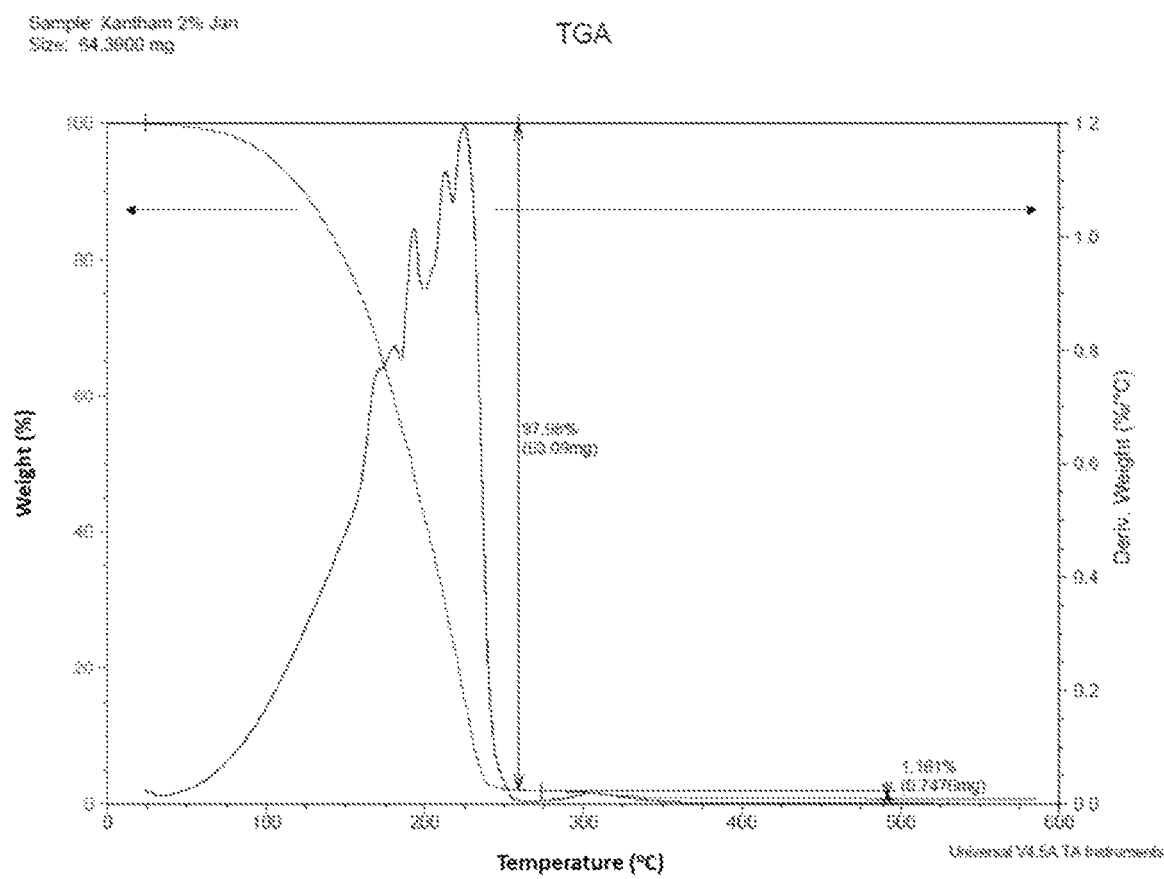

[Fig. 9]
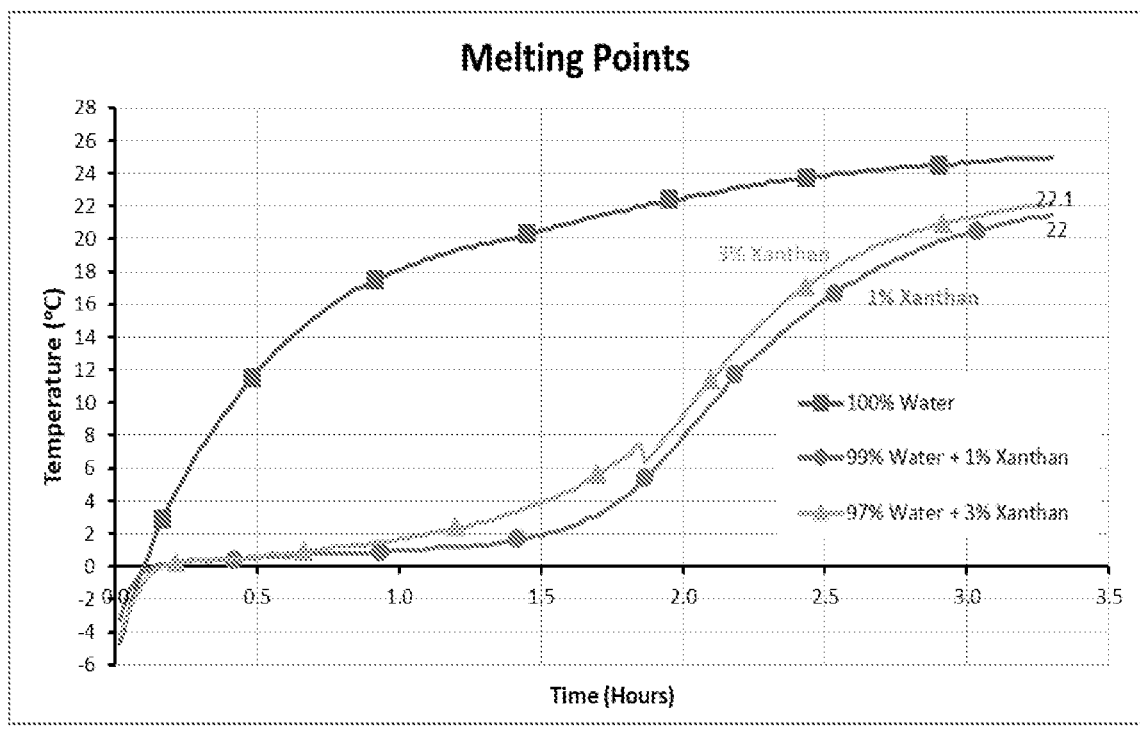

[Fig. 10]
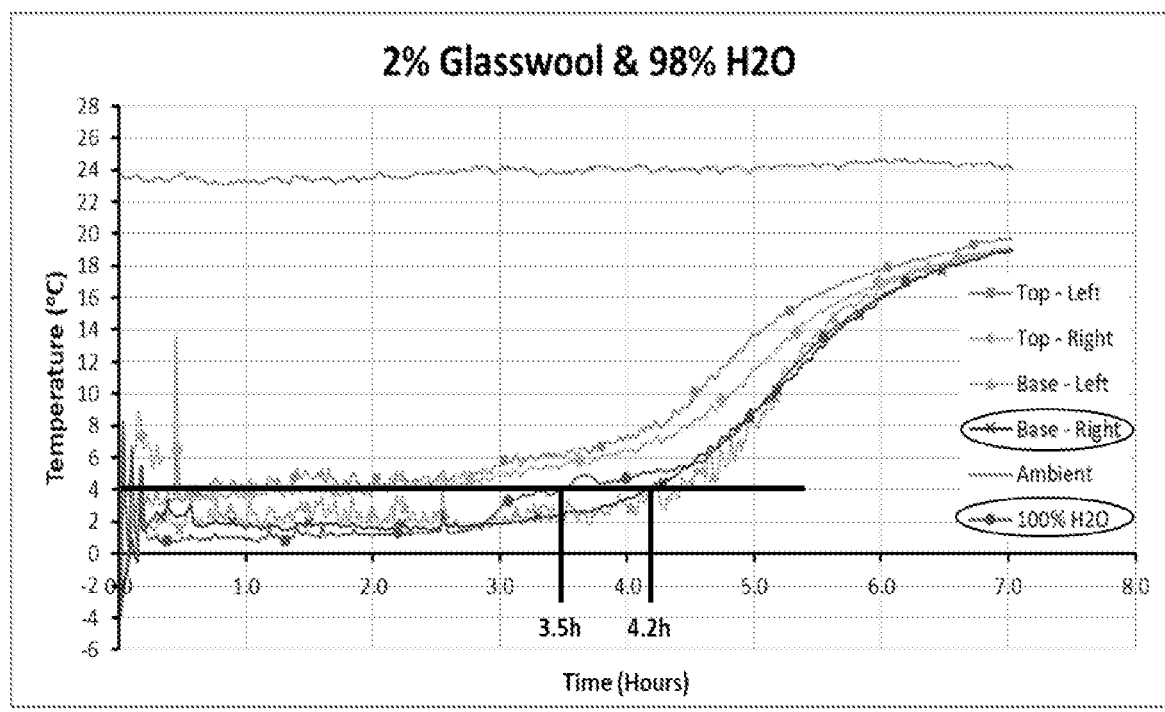

[Fig. 11]
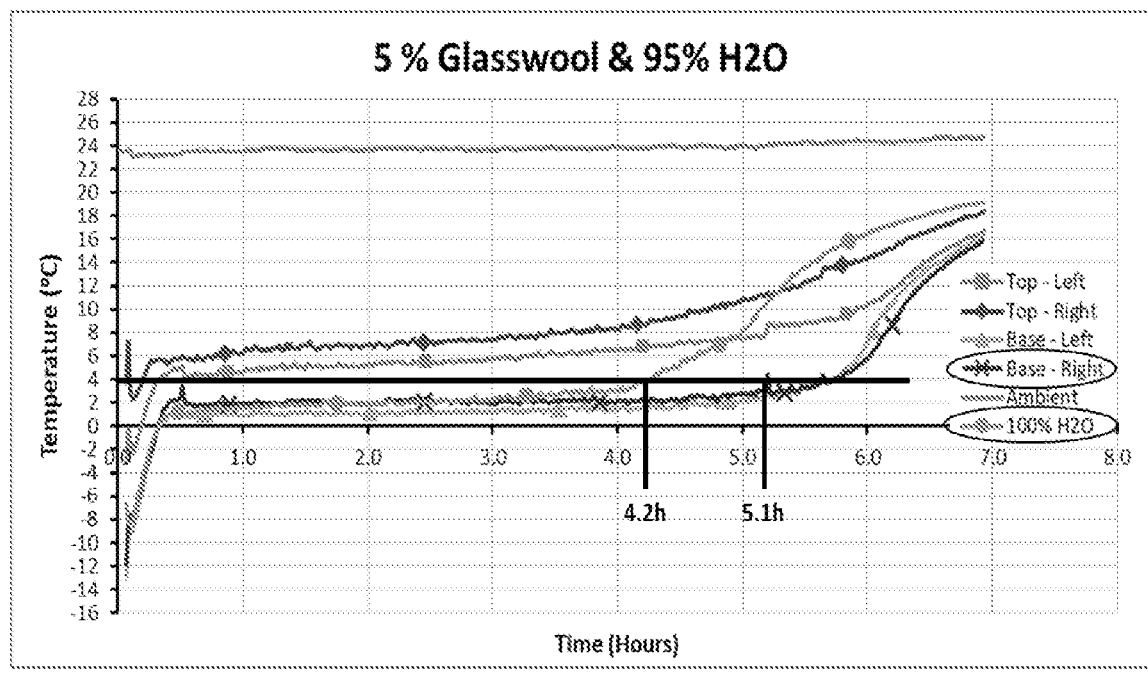

PHASE CHANGE MATERIAL COMPOSITION AND METHOD OF PREPARATION THEREOF

CROSS-REFERENCE TO RELATED APPLICATIONS

This patent application is a U.S. National Phase Application Under 35 U.S.C § 371 of International Application No. PCT/SG2018/050133, filed Mar. 23, 2018, entitled "A Phase Change Material Composition and Method of Preparation Thereof," which claims the benefit of priority of Singapore Patent Application No. 10201702394X, filed on Mar. 23, 2017.

TECHNICAL FIELD

The present invention generally relates to a phase change material (PCM) composition. The present invention also relates to a method of preparing the said composition and uses of the composition thereof.

BACKGROUND ART

With globalization, the world has become more interconnected. Businesses grow not only within a country, but also across boundaries, causing transportation of goods to become an important aspect in the society. In particular, cold chain transportation has been gaining attention for food and pharmaceuticals, such that the freshness of frozen food, vegetables and seafood can be maintained, and shelf life of pharmaceutical drugs and other chemicals can be prolonged. Hence, a desired packaging system is required to maintain the temperature during storage and transportation for long durations of time.

The current commercial cold boxes used for cold chain are not ideal given the high costs of manufacturing and long periods of time required for the manufacture. Many have researched in a hope to improve the efficiency of the weight of the cold box system as a whole, as the cost of transportation and the duration of effective working time of the cold box have always been the main concerns for transportation. In the pharmaceutical industry for example, vaccines have a strict temperature range to adhere to, while being transported over long durations of time. Another example relates to the transportation of seafood which has been conventionally carried out by ice packing and optionally entails the use of a generator in the storage compartment to keep temperatures low. However, such measures lead to high transportation costs. In this regard, with an improvement in the efficiency of the cold box in mind, companies can do away with the generators and ensure that the quality of the products is preserved during transportation, saving much on transportation costs.

The commercial vacuum insulated panels (VIP) in the markets involve vacuum packed, low-conductivity, open-porous structured materials in an aluminium bag, such that pockets of air in the porous structures are locked in the panel and act as thermal insulation. However, the effective working time of the panel is dependent on the thermal conductivity of the core material, which can be improved only by changing a new core material with lower thermal conductivity. The manufacturing process also requires large and costly equipment.

PCMs on the other hand can insulate heat by absorbing the heat and causing a change in phase. However, the drawback of the current PCM is that these materials generally may not have high specific heat capacities such that they can be employed in cold chain transportation for extended periods of time. Hence, research is ongoing to come up with materials with a larger specific heat capacity so that they can be more efficient in insulating heat and prolonging the working time during transportation.

In view of the above reasons, there is a need to provide a phase change material composition that overcomes, or at least ameliorates, one or more of the disadvantages described above.

SUMMARY OF INVENTION

In one aspect, there is provided a phase change material (PCM) composition comprising a PCM, glass fibers and xanthan gum.

The overall thermal conductivity of the PCM composition is advantageously reduced by the addition of the additives, e.g., glass fibers and/or xanthan gum. However, it has been surprisingly found that, despite the lower heat capacity of the additives (when compared to a PCM like water), the overall latent heat (e.g. the amount of energy required to cause a change in state) of the disclosed PCM composition is greater than that of a PCM alone without the additives.

Advantageously, the PCM composition of the present disclosure exhibits a longer period for complete phase change (e.g. from solid to liquid). For instance, it was found that the presence of 2% glass wool could advantageously extend the time taken for a frozen PCM composition comprising the glass wool to reach a temperature of 4° C. by approximately 1.5 hours as compared to a PCM composition without the glass wool. Further advantageously, the glass wool could improve the insulation performance of the PCM composition by 30-50%.

Moreover, it was found that the presence of xanthan gum in the PCM composition could extend the time taken for a frozen PCM composition to reach a temperature of 8° C. from half an hour to more than two hours. The xanthan gum may advantageously reduce the thermal conductivity of the mixture due to stronger hydrogen bonding interaction in the PCM composition.

In another aspect, there is provided a stackable, sealable package enclosing the PCM composition as disclosed herein within said package, said package further comprising at least one three-dimensional support structure inserted therein, said support structure being conformed to the dimensions of the package to thereby provide a fixed geometrical shape to said package.

In another aspect, there is provided an insulation layer comprising at least the stackable, sealable package as disclosed herein, said package being coupled to at least one additional layer of glass microparticles, which are vacuum sealed in a packaging material.

Advantageously, air gaps between the stackable, sealable package as disclosed herein and the layer of glass microparticles are substantially minimized which may result in a reduction in the thermal conductivity and an improvement in the thermal insulation properties. Further advantageously, the insulation layer could also result in a reduction in the size and volumetric dimensions of an insulation device employing said insulation layer, which in turn leads to savings in cold chain transportation costs.

In a further aspect, there is provided an insulation device comprising the PCM composition, and/or the stackable, sealable package, and/or the insulation layer as disclosed herein.

Advantageously, the insulation performance of the insulation device could be about 30% better than conventional PCM insulation means. The insulation device could also prolonged the duration for keeping cold by at least about 50%, at least about 55%, at least about 60%, at least about 65%, at least about 70%, at least about 75%, at least about 80%, at least about 85%, at least about 90%, at least about 95%, at least about 100%, or the duration could be prolonged by 2 times, 3 times, 4 times or 5 times, as compared to conventional insulation device. The insulation device could also advantageously result in about 10% reduction in overall weight as compared to conventional PCM-loaded high density polyethylene bottles.

In another aspect, there is provided a method of preparing the PCM composition as disclosed herein, the method comprising the steps of: a. providing the PCM in a solid state; b. adding to the solid PCM, glass fibers and at least one or more additives selected from the group consisting of: glass microparticles, polyacrylate, and xanthan gum; c. changing the PCM into a liquid state to thereby form a liquid mixture comprising the PCM and said additives; and d. agitating the liquid mixture obtained from step c to form the PCM composition.

A well-dispersed PCM composition could surprisingly be obtained from the method of preparing the PCM composition as disclosed herein. The well-dispersed PCM composition could advantageously result in an overall reduction in the thermal conductivity of the PCM composition, which in turn leads to an increase in the efficiency of the insulation performance of the PCM.

Definitions

The following words and terms used herein shall have the meanings indicated:

The term "phase change materials" or "PCMs", when used herein, may refer to substances with a high heat of fusion, undergo a phase change at a certain temperature, and are capable of storing and releasing large amounts of energy.

The phase change may be, but not limited to, melting and solidifying. PCMs as disclosed herein may also refer to organic compounds, inorganic compounds or mixtures thereof.

The term "glass" when used herein refers to a compound comprising the chemical structure $SiO_2$ or silica.

The term "glass fibers" as used herein refers to continuous or discontinuous cylindrical glass structure that is significantly longer than it is wide. The term "glass fibers" when used herein may refer to a plurality of intertwined glass fibers, which includes, glass wool.

The term "latent heat" as used herein refers to the heat absorbed or dissipated when a compound undergoes a change in state. The change in state may be, but not limited to liquid to solid and solid to liquid.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a phase change material (PCM) composition will now be disclosed.

The present disclosure relates to a phase change material (PCM) composition comprising a phase change material, glass fibers, and xanthan gum. The PCM composition of the present disclosure may further comprise glass fibers and/or a polyacrylic salt.

The PCM may be selected from fatty acids, paraffin wax, water or mixtures thereof. The fatty acids may be selected from the group consisting of capric acid, caprylic acid, caproic acid, lauric acid, eladic acid, palmitic acid, pentadeconoic acid, tristearin, myristic acid, palmatic acid, stearic acid and oleic acid. The PCM of the disclosed PCM composition may be water.

The PCM may be present in the PCM composition in an amount of at least about 60 wt. %, at least about 65 wt. %, at least about 70 wt. %, at least about 75 wt. %, at least about 80 wt. %, at least about 82 wt. %, at least about 85 wt. %, at least about 86 wt. %, at least about 87 wt. %, at least about 88 wt. %, at least about 89 wt. %, or at least about 90 wt. % based on the total weight of the PCM composition. The PCM may be present in the PCM composition in an amount of about 60 wt. %, about 65 wt. %, about 70 wt. %, about 75 wt. %, about 80 wt. %, about 82 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, about 96 wt. %, about 97 wt. %, about 98 wt. % or about 99 wt. % based on the total weight of the PCM composition, or in a range comprising an upper limit and a lower limit selected from any two of these amount.

The glass fibers may be present in the PCM composition of the present disclosure in an amount of about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.8 wt. %, about 2.0 wt. %, about 2.2 wt. %, about 2.4 wt. %, about 2.6 wt. %, about 2.8 wt. %, about 3.0 wt. %, about 3.2 wt. %, about 3.4 wt. %, about 3.6 wt. %, about 3.8 wt. %, about 4.0 wt. %, about 4.2 wt. %, about 4.4 wt. %, about 4.6 wt. %, about 4.8 wt. %, or about 5.0 wt. % based on the total weight of the PCM composition, or in a range comprising an upper limit and a lower limit selected from any two of these amount. The glass fibers may be present in the PCM composition in an amount of about 0.3 and about 5 wt. % based on the total weight of the PCM composition.

The PCM composition may comprise a xanthan gum in an amount of about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, or about 3.0 wt. % based on the total weight of the PCM composition, or in a range comprising an upper limit and a lower limit selected from any two of these amount.

Advantageously, the xanthan gum may increase the viscosity of the PCM composition in a substantially liquid state thereby preventing or reducing the occurrence of glass fibers aggregation. The increase in viscosity also advantageously resulted in the uniform dispersion of the glass fibers and PCM in the PCM composition.

The PCM composition of the present disclosure may further comprise a polyacrylic salt. The polyacrylic salt may be an alkali metal salt or an ammonium salt of polyacrylic acid. The polyacrylic salt may be polyacrylic sodium or polyacrylic potassium. The polyacrylic salt may have a molecular weight of about 10,000, about 50,000, about 100,000, about 150,000, about 200,000, about 250,000, about 300,000, about 350,000, about 400,000, about 450,000, about 500,000, about 550,000, about 600,000, about 650,000, about 700,000, about 750,000, about 800,000, about 850,000, about 900,000, about 9950,000, about 1,000,000, or in a range comprising an upper limit and a lower limit selected from any two of these molecular weights.

The PCM composition of the present disclosure may comprise a polyacrylic salt in an amount of about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. % based on the total weight of the PCM composition, or may be in a range comprising an upper limit and a lower limit selected from any two of these amounts.

The PCM composition of the present disclosure may further comprise glass microparticles. The glass microparticle may be, but not limited to, a microsphere. The microspheres of the PCM composition may have a diameter of about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, or about 150 µm, or may be provided in the PCM composition in a range comprising an upper limit and a lower limit selected from any two of these diameters. The diameter of the microsphere may be between about 10 µm and about 100 µm, or between about 20 µm and about 50 µm. The microspheres of the present disclosure may be hollow.

The glass microparticles may be provided in the PCM composition in an amount of about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2.0 wt. % based on the total weight of the PCM composition, or in a range comprising an upper limit and a lower limit selected from any two of these amount. The glass microspheres may be present in the PCM composition in an amount of about 0.2 and about 2 wt. % based on the total weight of the PCM composition.

The PCM composition of the present disclosure may contain weight ratio of glass fibers to xanthan gum of 25:1, 20:1, 18:1, 16:1, 14:1, 12:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, or in a range comprising an upper limit and a lower limit selected from any two of these ratios.

The PCM composition may further comprise a porous carbon source. The porous carbon may be selected from a carbon nanotube, carbon nanospheres or carbon nanofibers. Advantageously, the presence of a porous carbon source could suppress super cooling by acting as a nucleating agent. This allows the PCM composition to be re-usable as it alternates between the solid and liquid phases. Further, a surprisingly well-dispersed PCM composition comprising the porous carbon source could be achieved. Moreover, the presence of the porous carbon source in combination with xanthan gum and/or a polyacrylic salt could enhance the stability of the PCM composition.

The size of the porous carbon source of the present disclosure may be of about 1 nm, about 2 nm, about 3 nm, about 4 nm, about 5 nm, about 6 nm, about 7 nm, about 8 nm, about 9 nm, about 10 nm, about 12 nm, about 14 nm, about 16 nm, about 18 nm, about 20 nm, about 22 nm, about 24 nm, about 26 nm, about 28 nm, about 30 nm, about 32 nm, about 34 nm, about 36 nm, about 38 nm, about 40 nm, about 42 nm, about 44 nm, about 46 nm, about 48 nm, about 50 nm, about 55 nm, about 60 nm, about 65 nm, about 70 nm, about 75 nm, about 80 nm, about 85 nm, about 90 nm, about 95 nm, about 100 nm, about 110 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, or about 500 nm, or in a range comprising an upper limit and a lower limit selected from any two of these sizes. In some embodiments, the size of the porous carbon source may be between about 50 nm and 500 nm. The size may refer to the diameter where the porous carbon source is a carbon nanotube, carbon nanosphere or carbon nanofiber. The size may also refer to the length, breadth, height or thickness where the porous carbon source is a carbon nanotube or carbon nanofiber.

The melting point of the PCM composition of the present disclosure may have a melting point of about 0° C., about 0.2° C., about 0.4° C., about 0.6° C., about 0.8° C., about 1.0° C., about 1.2° C., about 1.4° C., about 1.6° C., about 1.8° C., about 2.0° C., about 2.2° C., about 2.4° C., about 2.6° C., about 2.8° C., about 3.0° C., about 3.2° C., about 3.4° C., about 3.6° C., about 3.8° C., about 4.0° C., about 4.2° C., about 4.4° C., about 4.6° C., about 4.8° C., about 5.0° C., about 5.2° C., about 5.4° C., about 5.6° C., about 5.8° C., about 6.0° C., about 6.2° C., about 6.4° C., about 6.6° C., about 6.8° C., about 7.0° C., about 7.2° C., about 7.4° C., about 7.8° C., or about 8.0° C., or in a range comprising an upper limit and a lower limit selected from any two of these temperatures, as determined by Differential Scanning calorimetry (DSC).

The present disclosure also relates to a stackable, sealable package enclosing the PCM composition as disclosed herein within the package. The package may further comprise at least one three-dimensional support structure inserted therein. The support structure may be conformed to the dimensions of the package to thereby provide a fixed geometrical shape to the package. The support structure may be configured to substantially abut the interior surface of the package to maintain the geometrical shape of said package.

The support structure may be composed of a polymer. The polymer may be a rigid, three-dimensional frame, wherein the packing material may substantially conform thereon, in order to achieve a desired geometrical outline or shape. In one embodiment, the support structure may comprise a polymer grid, e.g., a polyacrylate or polypropylene lattice structure.

The geometrical shape may be selected from a cube, cuboid, or cylinder. Advantageously, the presence of the support structure may allow the packages to be substantially coupled to one another and/or to other surfaces without leaving gaps between the contacting surfaces. This in turn leads to space-efficient packing and also eliminates the presence of air gaps between the PCM package and the adjoining surface to which it is coupled to.

The package may be composed of a material selected from the group consisting of low density polyethylene, high density polyethylene, polyester, polycarbonate, polypropylene and aluminum. The package may be made of aluminum.

The present disclosure also relates to a method of preparing the PCM composition as disclosed herein, the method comprising the steps of:

a. providing the PCM in a solid state;
b. adding to the solid PCM, glass fibers and at least one or more additives selected from the group consisting of: glass microparticles, polyacrylic salt, and xanthan gum;
c. changing the PCM into a liquid state to thereby form a liquid mixture comprising the PCM and said additives; and
d. agitating the liquid mixture obtained from step c to form the PCM composition.

The PCM, glass fibers, glass microparticles, polyacrylic salt and xanthan gum may be as disclosed above.

The method may comprise adding glass fibers and xanthan gum to the solid PCM in step b. In an embodiment, glass fibers, xanthan gum and polyacrylic salt may be added to the solid PCM in step b. In another embodiment, glass fibers, glass microparticles, xanthan gum and polyacrylic salt may be added to the solid PCM in step b. In another embodiment, glass fibers, glass microparticles, xanthan gum and polyacrylic salt may be added to the ice in step b.

The glass fibers may be provided in step b as glass wool.

The method further comprises a step of reducing the dimensions or size of the glass fibers or glass wool additive prior to the addition step b. The dimensions or size may be reduced by physical or mechanical means. The dimensions may be reduced by blending, cutting, chopping, grinding, shearing, milling or tearing.

The glass wool, before undergoing size reduction, may have a length of about 0.5 mm, about 1 mm, about 1.2 mm, about 1.4 mm, about 1.6 mm, about 1.8 mm, about 2.0 mm, about 2.2 mm, about 2.4 mm, about 2.6 mm, about 2.8 mm, or about 3.0 mm, or in a range comprising an upper limit and a lower limit selected from any two of these lengths. The glass wool, before undergoing size reduction, may have a width of about 0.5 mm, about 0.6 mm about 0.8 mm, about 1 mm, about 1.2 mm, about 1.4 mm, about 1.6 mm, about 1.8 mm, or about 2.0 mm, or in a range comprising an upper limit and a lower limit selected from any two of these widths. In an embodiment, the glass wool, before undergoing size reduction, may have a size of about 1 to about 3 mm in length and about 1 to about 2 mm in width.

The glass wool, after undergoing size reduction, may have a length of about 0.10 mm, about 0.12 mm, about 0.14 mm, about 0.16 mm, about 0.18 mm, about 0.20 mm, about 0.22 mm, about 0.24 mm, about 0.26 mm, about 0.28 mm, about 0.30 mm, about 0.32 mm, about 0.34 mm, about 0.36 mm, about 0.38 mm, about 0.40 mm, about 0.42 mm, about 0.44 mm, about 0.46 mm, about 0.48 mm, or about 0.50 mm or in a range comprising an upper limit and a lower limit selected from any two of these lengths. The glass wool, after undergoing size reduction, may have a width of about 0.10 mm, about 0.12 mm, about 0.14 mm, about 0.16 mm, about 0.18 mm, about 0.20 mm, about 0.22 mm, about 0.24 mm, about 0.26 mm, about 0.28 mm, or about 0.30 mm, or in a range comprising an upper limit and a lower limit selected from any two of these widths. In an embodiment, the glass wool, after undergoing size reduction, may have a size of about 0.1 to about 0.5 mm in length and about 0.1 to about 0.3 mm in width.

The size of the each glass fiber in the present disclosure may have a length of about 1.0 µm, about 1.2 µm, about 1.4 µm, about 1.6 µm, about 1.8 µm, about 2.0 µm, about 2.2 µm, about 2.4 µm, about 2.6 µm, about 2.8 µm, about 3.0 µm, about 3.2 µm, about 3.4 µm, about 3.6 µm, about 3.8 µm, about 4.0 µm, about 4.2 µm, about 4.4 µm, about 4.6 µm, about 4.8 µm, or about 5.0 µm, or in a range comprising an upper limit and a lower limit selected from any two of these lengths. The diameter of the glass fiber of the present disclosure may have a diameter of about 20 nm, about 22 nm, about 24 nm, about 26 nm, about 28 nm, about 30 nm, about 32 nm, about 34 nm, about 36 nm, about 38 nm, about 40 nm, about 42 nm, about 44 nm, about 46 nm, about 48 nm, about 50 nm, about 52 nm, about 54 nm, about 56 nm, about 58 nm, about 60 nm, about 62 nm, about 64 nm, about 66 nm, about 68 nm, about 70 nm, about 72 nm, about 74 nm, about 76 nm, about 78 nm, about 80 nm, about 82 nm, about 84 nm, about 86 nm, about 88 nm, about 90 nm, about 92 nm, about 94 nm, about 96 nm, about 98 nm, or about 100 nm, or in a range comprising an upper limit and a lower limit selected from any two of these diameters. The size of each glass fiber may be as disclosed above before and/or after undergoing size reduction.

The glass fibers may be heated prior to step b. The glass fibers may be heated before the size reduction step. The glass fibers may be heated to a temperature of about 70° C., about 75° C., about 80° C., about 85° C., about 90° C., about 95° C., or about 100° C., or in a range comprising an upper limit and a lower limit selected from any two of these temperatures. In an embodiment, the glass fibers may be heated at or above 90° C. In certain embodiments where glass microparticles are added in step b, the glass microparticles, may be heated to a temperature of about 70° C., about 75° C., about 80° C., about 85° C., about 90° C., about 95° C., or about 100° C., or in a range comprising an upper limit and a lower limit selected from any two of these temperatures.

The glass fibers may be heated for at least 4 hours, at least 5 hours, at least 6 hours, at least 7 hours, at least 8 hours, at least 9 hours, or at least 10 hours.

Advantageously, gas present in the pores of or between the glass fibers may be substantially reduced by heating the glass fibers. The reduction in the amount of gas present in the PCM composition of the present disclosure could advantageously improve the thermal insulation efficiency.

The PCM of step a may be provided in a solid state by cooling to a temperature of about 0° C., about −2° C., about −4° C., about −6° C., about −8° C., about −10° C., about −12° C., about −14° C., about −16° C., about −18° C., about −20° C., about −22° C., about −24° C., about −26° C., about −28° C., about −30° C., about −32° C., about −34° C., about −36° C., about −38° C., about −40° C., about −42° C., about −44° C., about −46° C., about −48° C., about −50° C., or about −196° C., or in the range comprising an upper limit and a lower limit selected from any two of these temperatures. In an embodiment, the PCM may be cooled at −30° C.

The present disclosure further contemplates a method of preparing a PCM composition as disclosed herein that is housed within a package, the method comprising providing a sealable, stackable package as disclosed herein, optionally inserting a three-dimensional support structure into said package, said three-dimensional support structure comprising a frame configured to receive a PCM material (which can be in liquid or solid state; adding to the PCM, glass fibers and at least one or more additives selected from the group consisting of: glass microparticles, polyacrylic salt, and xanthan gum; optionally changing the PCM into a liquid state (if initially provided in solid state) to thereby form a liquid mixture comprising the PCM and said additives; and agitating the liquid mixture obtained therefrom form a PCM composition contained within said sealable package.

Advantageously, the air trapped in the PCM may be substantially removed by the cooling. The solidified PCM may also be substantially devoid of air.

Step b of the method may be carried out by adding the solid PCM, the glass fibers and the at least one or more additives into a sealable package. The package may be sealed immediately after the addition. The package may be sealed by using an industry seal bar for 5 to 8 seconds. The package may be composed of a material as disclosed above.

In step c of the disclosed method of preparing the PCM composition, the PCM may be changed into a liquid state by exposing the liquid mixture to temperature substantially higher than the melting point of the PCM. The liquid mixture may be exposed to a temperature of about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 40° C., about 45° C., about 50° C., about 55° C., about 60° C., about 65° C., about 70° C., or about 75° C., or in the range comprising an upper limit and a lower limit selected from any two of these temperatures. The liquid mixture may be exposed to room/ambient conditions, such as at temperature of about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., or about 35° C.

The liquid mixture in step d of the disclosed method of preparing the PCM composition may be subject to agitation by shaking, vibration, blending, sonication, or ultrasonication, The method of preparing the PCM composition as disclosed herein may further comprise a step f of changing the liquid PCM composition from step d into a solid state. The PCM composition may be changed into the solid state by cooling the composition at a temperature of about 0° C., about −2° C., about −4° C., about −6° C., about −8° C., about −10° C., about −12° C., about −14° C., about −16° C., about −18° C., about −20° C., about −22° C., about −24° C., about −26° C., about −28° C., about −30° C., about −32° C., about −34° C., about −36° C., about −38° C., about −40° C., about −42° C., about −44° C., about −46° C., about −48° C., about −50° C., or about −196° C., or in the range comprising an upper limit and a lower limit selected from any two of these temperatures.

The present disclosure also relates to an insulation layer which may comprise at least the package as disclosed above wherein the package may be coupled to at least one additional layer of glass microparticles as defined above, which may be vacuum sealed in a packaging material. In certain embodiments, the additional layer may be a vacuum insulation panel. The combination of the PCM package and the additional layer may be used to provide a multilayer insulation material. The multilayer insulation material may comprise one or more layers of either said package or said additional layer, which can be determined independently. The package and additional layer may be arranged as alternating layers when combined as the multilayer material. In other embodiments, a plurality of the PCM packages may be stacked adjacent to one another and coupled to at least one or more layers of said additional layer.

The present disclosure further relates to an insulation device comprising the PCM composition, and/or the package, and/or the insulation layer as disclosed herein.

The insulation device may be selected from cold box, cooling pad, building wall, pipes and pipe fittings, or vacuum insulation panel. The insulation device may be a cold box. Advantageously, it has been found that a cold box comprising the PCM package and the insulation layer as disclosed herein, may provide superior insulation properties while being lighter in weight relative to cold boxes using conventional insulation panels.

Advantageously, the temperature in the cold box may be maintained at temperature range of between about 2° C. and about 6° C. for at least about 1 hour, at least 1.5 hours, at least 2 hours, at least 2.5 hours, at least 3 hours, at least 3.5 hours, at least 4 hours, at least 4.5 hours, at least 5 hours, at least 5.5 hours, at least 6 hours, at least 6.5 hours, at least 7 hours, at least 7.5 hours, at least 8 hours, at least 8.5 hours, at least 9 hours, at least 9.5 hours, or at least 10 hours.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a diagram illustrating a PCM composition according to the present invention when combined with a vacuum insulated panel comprising vacuum-packed glass bubbles.

FIG. 2 is a diagram illustrating the current PCM packages where the PCM are filled in aluminum bags.

FIG. 3 is a diagram of a polymer grid for PCM shaping.

FIG. 4 is a schematic diagram illustrating conventional design of VIP panel and

PCM mixture in cold box packaging. In particular, there is an air gap between the VIP panel and the PCM mixture which contributes to significant heat conduction from ambient, leading to low efficiency. The air gap allows heat to transmit through and it reduces the efficiency of the overall system.

FIG. 5 is a schematic diagram illustrating the design of VIP panel and PCM mixture in cold box packaging in the present application. The VIP panel and the PCM mixture are in direct contact and there is no air gap in between the two components.

FIG. 6 is a Differential Scanning calorimetry (DSC) graph for water (100%).

FIG. 7 is a Differential Scanning calorimetry (DSC) graph for a mixture of 2% xanthan gum and 98% water. It is shown in FIG. 7 that the melting point of the mixture is increased (5.5° C.) compared to water alone (2.8° C.). The increase in the temperature for a phase change in the mixture indicates that the mixture is more tolerant towards temperature changes.

FIG. 8 is a Thermogravimetric Analysis (TGA) graph for a mixture of 2% xanthan gum and 98% water. In the graph, the X-axis refers to the temperature change; the Y-axis refers to the weight change in the mixture. Usually, below a "specific temperature", the weight of the mixture is maintained at 95% or more. This "specific temperature" is used as a reference to determine the operation temperature for the mixture. In this case, the mixture of xanthan gum and water is stable below 90° C.

FIG. 9 is a melting point test for the composition of xanthan gum and water at ambient temperature. The compositions with the xanthan gum took a longer time to reach a particular temperature compared to pure water alone. This suggests that the presence of xanthan gum in water can reduce thermal conductivity of the mixture due to stronger hydrogen bonding interaction in the respective compositions.

FIG. 10 is a temperature data-logging profile diagram of 2% glass wool and 98% water. The curves representing water and a mixture consisting of 2% glass wool and 98% water were compared. The "Base—Right" curve of the mixture is used because heat dissipates upwards, hence, the base temperature would give a better representation of the temperature change of the mixture.

From the curve representing 100% water, the temperature of ice rose to 4° C. after being exposed to room conditions after 3.5 hours. However, the mixture of 2% glass wool and 98% water requires a longer duration of 4.2 hours to reach the same temperature. This shows that the mixture containing xanthan gum is more capable of insulating heat compared to water alone.

FIG. 11 is a temperature data-logging profile diagram of 5% glass wool and 95% water. The curves representing water and a mixture consisting of 5% glass wool and 95% water were compared. The "Base—Right" curve of the mixture is used because heat dissipates upwards. Hence, the base temperature would give a better representation of the temperature change of the mixture.

From the curve representing 100% water, the temperature of ice rose to 4° C. after being exposed to ambient conditions after 4.2 hours. However, the mixture of 5% glass wool and 95% water requires a longer duration of 5.1 hours to reach the same temperature under ambient conditions. This shows that the mixture containing xanthan gum is more capable of insulating heat compared to water alone.

DETAILED DESCRIPTION OF DRAWINGS

Referring to FIG. 1, a hybrid comprising a PCM composition and a vacuum insulated panel. The said composition may comprise xanthan gum (12) and glass wool (11) which are in contact with a phase change material. The composition may optionally comprise a polyacrylic salt (13). A vacuum insulated panel (VIP) is brought into contact with the PCM composition and the said VIP may comprise a layer of glass bubbles (14).

Referring to FIG. 2, a diagram showing the current PCM packages where the PCM are filled in aluminium bags. One major issue with the current packaging is the uneven shapes, for instance, a sunken section (22) may be observed after the phase change material has solidified. Further, a bulging centre (21) may surface when the PCM is in liquid state. The unevenness of the PCM in the aluminium bag is not ideal as it does not give an even distribution of the phase change material mixture. This reduces the efficiency of the phase change material, and heat may penetrate faster at the edges as compared to at the centre.

EXAMPLES

Non-limiting examples of the invention and a comparative example will be further described in greater detail by reference to specific Examples, which should not be construed as in any way limiting the scope of the invention.

Example 1—Preparation of a Phase Change Material (PCM) Composition

First, 10 g of glass wool (2% by weight of water) with a size of 1-3 mm by 1-2 mm was reduced in size into a powder form. The reduced glass wool was then put in an oven at 90° C. for 6 hours and this step is done to decrease the gas trapped inside the pores of the glass wool. 410 g of phase change material (PCM), using water as a PCM was cooled at −30° C. to become a solid. This was done to reduce the amount of air trapped inside the PCM. Glass wool was then put into a phase change material container, such as a plastic bag or HDPE bottle, followed by the addition of the cooled PCM at −30° C., 5 g of glass bubbles with a size between 20 to 50 micrometres, 5 g of xanthan gum and 5 g of potassium acrylate. The formulated mixture is quickly sealed using an industrial seal bar for 5-8 seconds. Subsequently, the PCM in the mixture is allowed to melt at room temperature. In the liquid state, the mixture is placed under ultrasound for 20 minutes and physically shaken for 10 minutes.

Example 2—Preparation of Phase Change Material (PCM) Compositions for Temperature Change Data Profiling 2 samples of PCM compositions were prepared for data profiling. 2 portions of glass wool of 10 g and 25 g each were reduced in size into a powder form respectively. The reduced glass wool was then put in an oven at 90° C. for 6 hours and to remove all trapped moisture. The glass wool was subsequently put into HDPE bottles and filled with 490 g and 475 g of water respectively. The formulated mixtures were placed in a freezer for 24 hours at −20° C. After the mixtures have solidified after 24 hours, the respective HDPE bottles were taken out from the fridge and temperature sensors were attached onto the HDPE bottles at room temperature. Temperature change of the HDPE bottles were recorded every minute for data profiling.

Example 3—Process for Packing Phase Change Material (PCM)

A suitable sized polymer grid which matches the packaging bag of the PCM composition is used in this process.

The polymer grid is inserted into an aluminium bag and the edges are folded to allow the bag to take the shape of the grid. The desired amount of PCM is first put into the freezer for solidification. Usually a duration of 12 hours is required for the solidification to take place. The solidified PCM is next put into the aluminium bag and sealed using a vacuum packing machine with a sealing time of 3 seconds under normal pressure.

Example 4—Process for Fabrication of Vacuum Insulated Panels

Glass bubbles were put in an oven at 90° C. for 6 hours to remove all moisture. A laminated aluminium bag was put into a rectangular acrylic mold. The dried glass bubbles were poured into the aluminium bag, where the aluminium bag took the shape of the rectangular acrylic mold. With the shape-fixing function of the mold, the glass bubbles in the aluminium bag can take on a rectangular shape. A thin Styrofoam was fitted at the top of the aluminium bag to ensure a tight seal to prevent the glass bubble from flowing out of the bag. The whole aluminium bag was vacuum sealed under vacuum for 20 seconds and a sealing time of 3 seconds.

Example 5—Process for Preparing a Hybrid of PCM Packing and Vacuum Insulated Panels (VIP)

The vacuum insulated panel fabricated in Example 4 is used in the present process. The polymer grid is placed on top of the vacuum insulated panel. A single layer of laminated aluminium paper is attached to the polymer grid. The two sides of the top PCM layers are sealed with vacuum insulated panel machine at normal pressure. The pre-cooled phase change material is placed into the system followed by sealing under vacuum.

Example 6—Performance Evaluation of the PCM Compositions

Differential Scanning calorimetry (DSC) and Thermogravimetric analysis (TGA) were conducted to determine the latent heat along with thermal stability of the phase change materials. In the compositions described herein, it is aimed to achieve a phase transition process similar to water, but with a phase change temperature within a tolerable temperature range of the cold box contents. For the PCM compositions described herein, they are compared to the phase change properties of water with a melting point at 2.8° C., where the DSC curve for water is found in FIG. 6. The phase change materials described herein are all stable below 100° C. Based on the DSC results, it is suggested that latent heat performance for the new phase change material composition remains almost the same as that of water. An example is the DSC of 2% Xanthan Gum+98% $H_2O$ in FIG. 7. The melting process is stable and constant throughout as depicted by the smooth dip in the DSC and TGA curves in FIGS. 7 and 8 respectively. The melting point on the other hand has shifted from 2.8° C. to 5.5° C., where ΔT is about 2-3° C. more than water. This falls within the tolerable temperature range of the cool box, signifying that the composition of xanthan gum and water has a greater efficiency in insulating heat.

The following mixtures were tested for reliability as a cold pack insulating material: 1) 100% $H_2O$ 2) 1% xanthan gum+99% $H_2O$ and 3) 3% xanthan gum+97% $H_2O$. 1% and 3% xanthan gum was formulated and mixed with water according to the respective weight percentage. Each formulated mixture was then poured into a 100 ml test tube. Temperature sensors were inserted and the test tubes were placed in a −20° C. freezer. Once the mixture has solidified, the whole test tube set-up is taken out of the freezer and placed at ambient temperature. The temperature sensors were then connected to a data-logger for the logging of the melting temperature profile of the mixture.

The Temperature vs Time graphs were then plotted in FIG. 9. It is clearly observed that the temperature behaviour of the mixtures of xanthan gum and water is quite different from pure phase change material (water). For example, it takes about half an hour to reach 8° C. for pure phase change material, while it takes more than 2 hours for the mixture of xanthan gum and water. This suggests that the presence of xanthan gum in water can reduce the thermal conductivity of the mixture due to stronger hydrogen bonding interaction in the mixture.

In order to evaluate the performance of the melting process, the frozen HDPE bottles with the respective compositions were laid out in ambient temperature. The temperature profile of the melting process was logged, and a temperature vs time graph was plotted in FIGS. 10 and 11 for the composition comprising 2% glass wool & 98% $H_2O$ and 5% glass wool & 95% $H_2O$ respectively. It can be clearly observed that the temperature behaviour of the new composition is different from pure phase change material (water). For example, when the 2% glass wool composition was employed, it took about 4.5 hours to reach 4° C., while pure phase change material took 3 hours. This indicates that traces of glass wool can improve the performance of insulating heat by 30-50% compared to using pure water alone. Similarly, a 30-50% performance improvement was observed when 5% glass wool was employed in the composition with water.

As can be seen in FIG. 9, the addition of xanthan gum to water increased the melting duration (as temperature rise to 4° C.) by 500-633%. Further, as shown in FIGS. 10 and 11, the addition of glass wool into water increased the melt duration by about 20%. The combination of both xanthan gum and glass wool in water has a synergistic effect, and would have a longer melt duration as compared to water alone.

INDUSTRIAL APPLICABILITY

The potential industrial applications of the disclosed PCM composition and the method of preparation thereof are self-evident. The disclosed PCM composition could be used in the manufacturing of cold boxes that may be used in the cold chain. The disclosed PCM composition could also be used in combination with a vacuum insulated panel to advantageously provide higher heat capacity and enhanced thermal insulation. The disclosed method of the present application is simple and could produce the disclosed PCM composition at low-cost.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A phase change material (PCM) composition comprising:
   a. a phase change material,
   b. glass fibers and glass microparticles, and
   c. xanthan gum.

2. The composition of claim 1, further comprising a polyacrylic salt.

3. The composition of claim 1, wherein the PCM is selected from fatty acids, paraffin wax, water or mixtures thereof.

4. The composition of claim 1, wherein the PCM is water.

5. The composition of claim 1, wherein the glass microparticles are microspheres having a diameter of between 10 to 100 µm.

6. The composition of claim 1, wherein the PCM is present in an amount of at least 90 wt. % or between 90 wt. % and 99 wt. % based on the total weight of the composition.

7. The composition of claim 1, wherein the glass fibers are present in an amount between 0.3 and 5 wt. % based on the total weight of the composition.

8. The composition of claim 1, wherein the weight ratio of the glass fibers to xanthan gum is between 25:1 to 1:10.

9. A stackable, sealable package enclosing a phase change material (PCM) composition within said package, wherein the PCM composition comprises:
a phase change material,
glass fibers and glass microparticles, and
xanthum gum;
wherein said package further comprises at least one three-dimensional support structure inserted therein, said at least one three-dimensional support structure being conformed to the dimensions of the package to thereby provide a fixed geometrical shape to said package.

10. The package of claim 9, wherein said at least one three-dimensional support structure is configured to substantially abut the interior surface of the package to maintain the fixed geometrical shape of said package.

11. The package of claim 9, wherein the package is composed of a material selected from the group consisting of low density polyethylene, high density polyethylene, polyester, polycarbonate, polypropylene and aluminum.

12. The package of claim 11, wherein the package is composed of aluminum.

13. The package of claim 9, wherein said at least one three-dimensional support structure is composed of a polyacrylate lattice structure.

14. A method of preparing a phase change material (PCM) composition comprising:
a phase change material,
glass fibers and glass microparticles, and
xanthan gum;
wherein the method comprises:
a. providing the PCM in a solid state;
b. adding to the solid PCM, glass fibers, glass microparticles and xanthan gum, and optionally a polyacrylic salt;
c. changing the PCM into a liquid state to thereby form a liquid mixture comprising the PCM and said additives; and
d. agitating the liquid mixture obtained from operation c to form the PCM composition.

15. The method of claim 14, wherein prior to addition operation b, the method further comprises an operation of reducing the dimensions of the glass fibers.

16. The method of claim 15, wherein the glass fibers are reduced to a size of 1 to 3 mm in length and 1 to 2 mm in width.

17. The method of claim 15, wherein the glass fibers having reduced dimensions are heated to above 90° C. prior to operation b.

18. An insulation layer comprising at least a stackable, sealable package enclosing a phase change material (PCM) composition within said package, wherein the PCM composition comprises:
a phase change material,
glass fibers and glass microparticles, and
xanthan gum;
wherein said package further comprises at least one three-dimensional support structure inserted therein, said at least one three-dimensional support structure being conformed to the dimensions of the package to thereby provide a fixed geometrical shape to said package, where said package is coupled to at least one additional layer of glass microparticles, which are vacuum sealed in a packaging material.

19. The insulation layer of claim 18, wherein the glass microparticles of the PCM comprise glass microspheres having a diameter of 20 µm to 50 µm.

20. An insulation device comprising a phase change material (PCM) composition comprising:
a phase change material,
glass fibers and glass microparticles, and
xanthan gum.

* * * * *